US008947556B2

(12) United States Patent
Kobayashi

(10) Patent No.: US 8,947,556 B2
(45) Date of Patent: Feb. 3, 2015

(54) IMAGE PICKUP APPARATUS, CONTROL METHOD THEREFOR, AND STORAGE MEDIUM STORING CONTROL PROGRAM THEREFOR

(75) Inventor: Taro Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 13/605,192

(22) Filed: Sep. 6, 2012

(65) Prior Publication Data

US 2013/0076973 A1 Mar. 28, 2013

(30) Foreign Application Priority Data

Sep. 22, 2011 (JP) ................................ 2011-207293

(51) Int. Cl.
*H04N 5/235* (2006.01)
*H04N 5/238* (2006.01)
*H04N 5/228* (2006.01)

(52) U.S. Cl.
CPC .................................. *H04N 5/2356* (2013.01)
USPC ..... 348/229.1; 348/364; 348/362; 348/208.6; 348/221.1

(58) Field of Classification Search
CPC ........ H04N 5/235; H04N 5/238; H04N 5/228
USPC ............. 348/229.1, 362, 208.1, 208.4, 208.6, 348/221.1, 239
See application file for complete search history.

(56) References Cited

U.S. PATENT DOCUMENTS

| | | | | |
|---|---|---|---|---|
| 8,023,004 B2* | 9/2011 | Asoma | | 348/229.1 |
| 8,040,411 B2* | 10/2011 | Nakajima et al. | | 348/254 |
| 8,094,210 B2* | 1/2012 | Kawazoe | | 348/229.1 |
| 8,279,304 B2* | 10/2012 | Tanaka | | 348/229.1 |
| 8,390,698 B2* | 3/2013 | Shimizu et al. | | 348/222.1 |
| 8,803,985 B2* | 8/2014 | Kaizu et al. | | 348/208.4 |
| 2003/0098919 A1* | 5/2003 | Liu et al. | | 348/297 |
| 2011/0069200 A1* | 3/2011 | Oh et al. | | 348/229.1 |
| 2011/0069205 A1* | 3/2011 | Kasai et al. | | 348/239 |

FOREIGN PATENT DOCUMENTS

JP 63-306779 12/1988

OTHER PUBLICATIONS

S. Liu et al., "Synthesis of High Dynamic Range Motion Blur Free Image from Multiple Captures", IEEE Transaction on Circuits and Systems, vol. 50, No. 4, pp. 530-539 (Apr. 2003).*
S. Nayar et al., "High Dynamic Range Imaging: Spatially Varying Pixel Exposures". Proc. Conf. IEEE Computer Vision and Pattern Recognition, vol. 1, pp. 472-479 (Jun. 2000).*

* cited by examiner

*Primary Examiner* — Tuan Ho
*Assistant Examiner* — Marly Camargo
(74) *Attorney, Agent, or Firm* — Cowan, Liebowitz & Latman, P.C.

(57) ABSTRACT

An image pickup apparatus that is capable of reducing the load of the process required to combine images with different exposures to generate a composite image. An image pickup unit performs continuous image pickup that shoots a subject continuously under different exposure conditions. A control unit controls the image pickup unit so that the exposure condition for the first shot in a current set, which is a second or later set, is coincident with the exposure condition for the last shot in the previous set when a plurality of sets of the continuous image pickup are performed. A composing unit composes the images acquired by one set of the continuous image pickup by the image pickup unit to generate one output image.

5 Claims, 7 Drawing Sheets

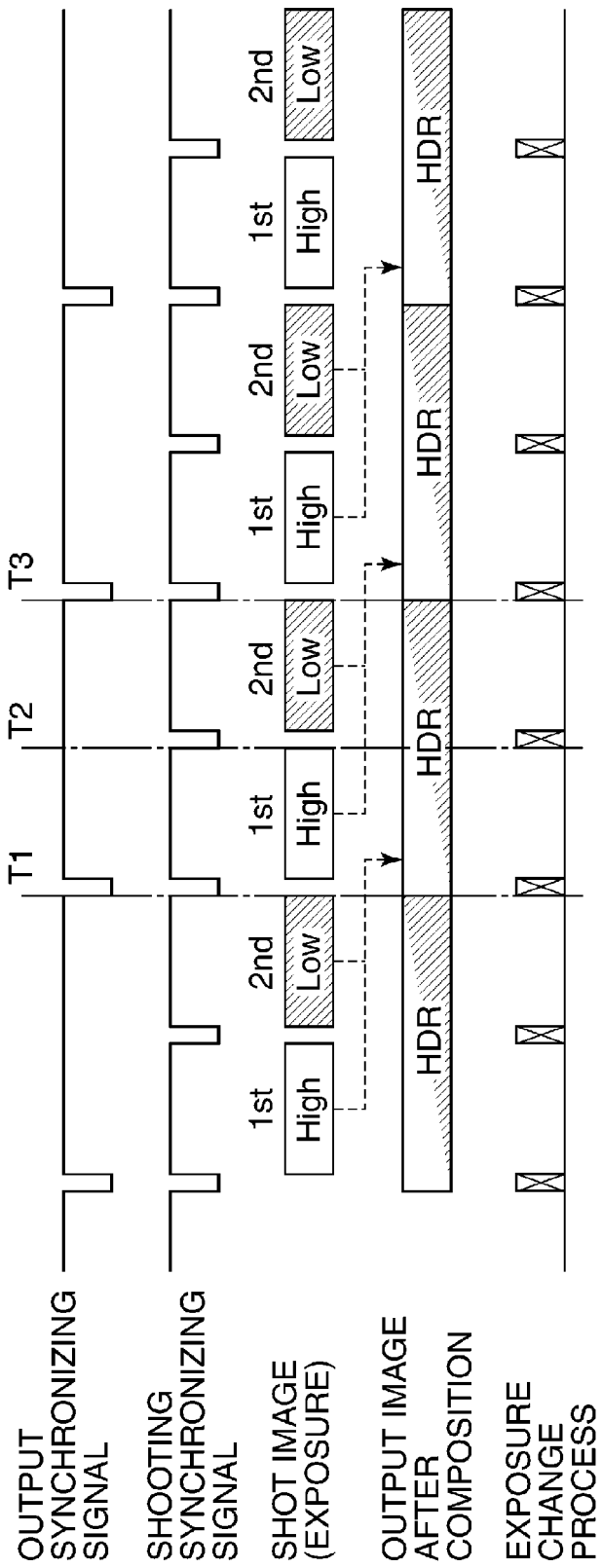

IMAGE PICKUP APPARATUS, CONTROL METHOD THEREFOR, AND STORAGE MEDIUM STORING CONTROL PROGRAM THEREFOR

BACKGROUND OF THE INVENTION

1. Field of the Invention

The present invention relates to an image pickup apparatus, a control method therefor, and a storage medium storing a control program therefor. It particularly relates to a technique for generating one image by composing a plurality of images.

2. Description of the Related Art

In recent years, many digital still cameras and digital video cameras using solid state image pickup devices, such as a CCD and a CMOS, are developed.

A dynamic range of a shot image in such a camera is usually dependent on a dynamic range of a solid state image pickup device. Whiteouts or blackouts occur in a background even if an exposure of a main object is correctly adjusted under a condition where contrast between the main object and the background is excessive due to backlight.

Japanese laid-open patent publication (Kokai) No. S63-306779 (JP S63-306779A) discloses a technique that expands a dynamic range by composing a plurality of images in order to solve such a problem, for example.

The technology substantially expands the dynamic range of a shot image in a video camera with a CCD image sensor by composing image signals of different storage time captured alternately so that the whiteout portions in a high exposure image with the long storage time and the blackout portions in a low exposure image with the short storage time are compensated by the other image signals.

FIG. 7 is a timing chart showing driving timing of an image pickup device and image output timing after composing images in a conventional general dynamic range expanding method.

In FIG. 7, an output synchronizing signal indicates the timing at which the image after composing the images is outputted, and its period corresponds to a frame rate of the image output. A shooting synchronizing signal indicates the timing at which an image of one frame is shot, and its period corresponds to a frame rate of the image shooting. In this example, the period of the output synchronizing signal is twice the period of the shooting synchronizing signal.

Synchronizing with the shooting synchronizing signal, the high exposure image High and the low exposure image Low are alternately acquired, and the image with expanded dynamic range HDR that is generated by composing the high and low exposure images is outputted as the following frame. An exposure change process is executed at the same timing as that for the shooting synchronizing signal.

In the acquisition method shown in FIG. 7, the high exposure condition that is higher than the correct exposure condition by one step is calculated based on the correct exposure condition of the subject acquired from an automatic exposure (AE) process at the time T1, and a high exposure image is shot under the calculated high exposure condition.

At this time, an exposure change process is executed as shown in FIG. 7. The exposure change process includes processes required for a switching direction to the exposure time of the image pickup device, a switching direction to a signal amplification amount, a change direction to an aperture value, etc. and accompanying operations of the image pickup device and the diaphragm mechanism, etc. in addition to the calculation process of a CPU.

At the following time T2, the low exposure condition that is lower than the correct exposure condition by one step is calculated, and a low exposure image is shot under the calculated low exposure condition. At this time, the exposure change process is executed as shown in FIG. 7.

At the following time T3, the image with expanded dynamic range that is generated based on the high exposure image shot in the second frame prior to the current frame and the low exposure image shot in the immediately preceding frame is outputted as a moving image. At the same time, the exposure change process is executed and the high exposure image of the following frame is shot like at the time T1.

As mentioned above, the images are acquired in order to generate an image with expanded dynamic range by repeating the operation that changes the high exposure image shooting and the low exposure image shooting, in the speed that is twice the frame rate for the output moving image.

However, the prior art mentioned above requires the reading speed as high as possible in order to reduce a gap of the exposure times of composite images. This increases the load of an image composing process, and a control accompanying high-speed reading, especially the exposure change process depending on the high-speed reading suppresses other various processes executed by the CPU.

SUMMARY OF THE INVENTION

The present invention provides an image pickup apparatus, a control method therefor, and a storage medium storing a control program therefor, which are capable of reducing the load of the process required to combine images with different exposures to generate a composite image.

Accordingly, a first aspect of the present invention provides an image pickup apparatus comprising an image pickup unit configured to perform continuous image pickup that shoots a subject continuously under different exposure conditions, a control unit configured to control the image pickup unit so that the exposure condition for the first shot in a current set, which is a second or later set, is coincident with the exposure condition for the last shot in the previous set when a plurality of sets of the continuous image pickup are performed, and a composing unit configured to compose the images acquired by one set of the continuous image pickup by the image pickup unit to generate one output image.

Accordingly, a second aspect of the present invention provides a control method for an image pickup apparatus that performs continuous image pickup that shoots a subject continuously under different exposure conditions, the control method comprising a control step of controlling the image pickup unit so that the exposure condition for the first shot in a current set, which is a second or later set, is coincident with the exposure condition for the last shot in the previous set when a plurality of sets of the continuous image pickup are performed, and a composing step of composing the images acquired by one set of the continuous image pickup by the image pickup unit to generate one output image.

Accordingly, a third aspect of the present invention provides a non-transitory computer-readable storage medium storing a control program causing a computer to execute the control method of the second aspect.

The present invention is capable of reducing the load of the process required to combine images with different exposures to generate a composite image.

Further features of the present invention will become apparent from the following description of exemplary embodiments with reference to the attached drawings.

BRIEF DESCRIPTION OF THE DRAWINGS

FIG. 7 is a timing chart showing driving timing of an image pickup device and image output timing after composing images in a conventional general dynamic range expanding method.

DESCRIPTION OF THE EMBODIMENTS

Hereafter, embodiments according to the present invention will be described in detail with reference to the drawings.

Figure 1:
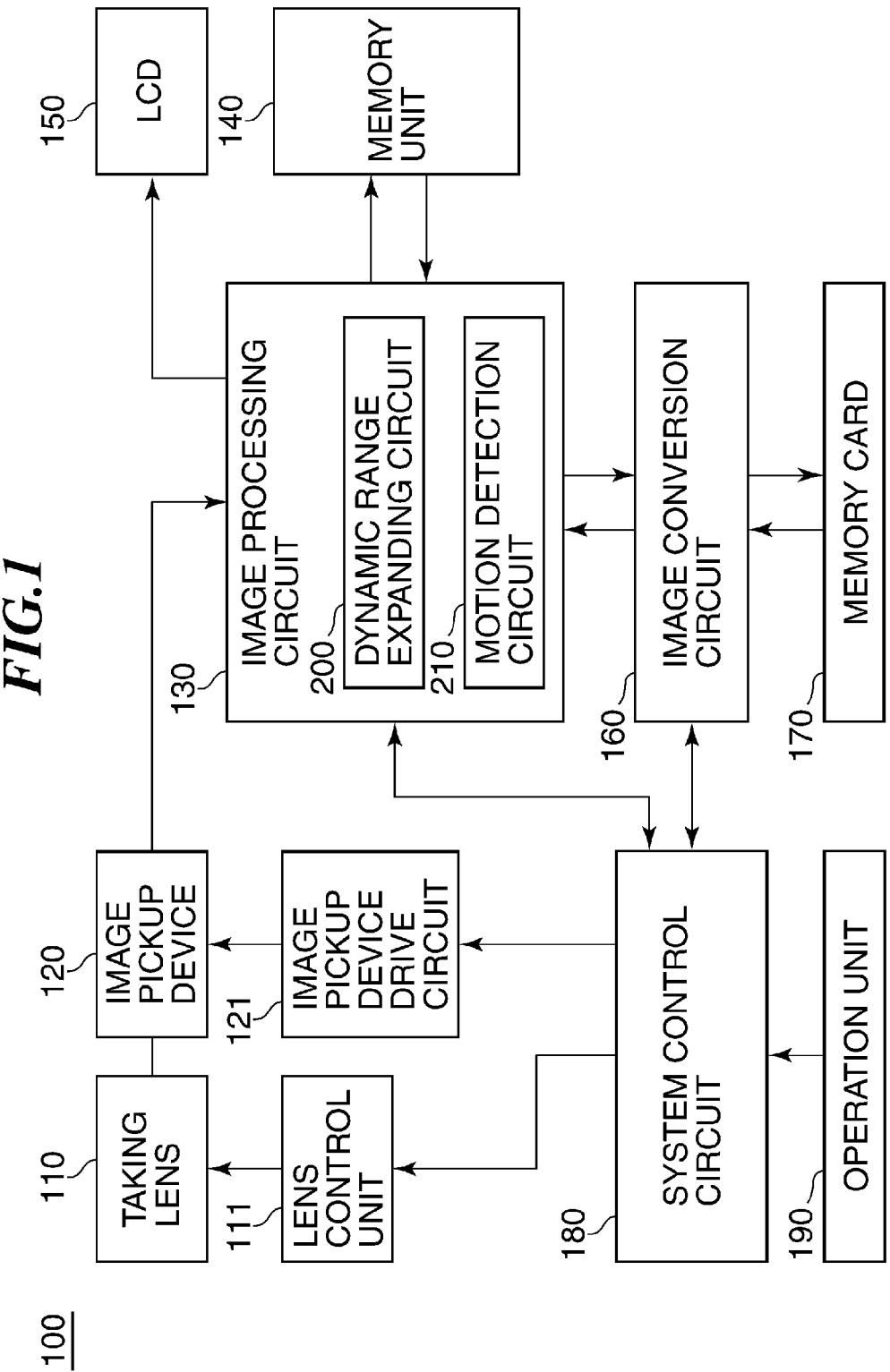
FIG. 1 is a block diagram schematically showing a configuration of an image pickup apparatus according to an embodiment of the present invention.

FIG. 1 is a block diagram schematically showing a configuration of an image pickup apparatus 100 according to an embodiment of the present invention. It should be noted that FIG. 1 shows the common configuration to the below-mentioned first, second, and third embodiments.

In FIG. 1, a taking lens 110 forms a subject image on an image pickup device 120. Although the taking lens 110 is shown as a single block, it consists of a plurality of lenses including a focusing lens and a zooming lens, in fact. Moreover, a diaphragm mechanism is also contained in the taking lens 110.

A lens control unit 111 controls the focus, focal length, and aperture of the taking lens 110 based on a control by a system control circuit 180.

The image pickup device 120 is a CMOS sensor that generates electric charge depending on incident light amount by photoelectric conversion and outputs.

An image-pickup-device-drive circuit 121 drives the image pickup device 120 based on a control by the system control circuit 180. The image-pickup-device-drive circuit 121 reads signals from all the pixels of the image pickup device 120, adds signals from specific pixels, and reads signals by skipping every specific number of lines or rows. Shooting exposure time, a signal amplification amount, etc. of the image pickup device 120 can be changed based on a control by the image-pickup-device-drive circuit 121. The taking lens 110, the lens control unit 111, the image pickup device 120, and the image-pickup-device-drive circuit 121 correspond to the image pickup unit that is configured to shoot a subject continuously (continuous image pickup) under different exposure conditions.

The image signal outputted from the image pickup device 120 is taken into an image processing circuit 130 that includes a dynamic range expanding circuit 200. The dynamic range expanding circuit 200 is provided with a function that generates an image with expanded dynamic range using a high exposure image and a low exposure image that have been saved beforehand in a memory unit 140. The dynamic range expansion circuit 200 corresponds to the composing unit that composes images acquired through one set of the continuous image pickup by the image pickup unit into one image.

A motion detection circuit 210 corresponds to the detection unit that detects a subject's movement, detects the movement of a main subject based on the image in the current frame and the image of the previous frame if needed, and transmits a detection result to the system control circuit 180.

The image processing circuit 130 converts the image signal into a digital signal, performs various signal processes, such as a gamma process and a chrominance-signal process, and outputs the image data. In the process, the image processing circuit 130 writes an image signal into the memory unit 140, and reads it from the memory unit 140. The output from the image processing circuit 130 can also be displayed on a LCD panel 150.

The processed image data outputted from the image processing circuit 130 is compressed by an image conversion circuit 160, and is written in a memory card 170.

The image conversion circuit 160 has a function to compress the image data from the image processing circuit 130 and to output it to the memory card 170, and a function to decompress the image data read from the memory card 170 and to output it to the image processing circuit 130.

The system control circuit 180 performs an autofocus (AF) process, an automatic exposure (AE) process, an electronic flash (EF) process (pre-emission of flash), etc. in the TTL (through the lens) system using the image data outputted from the image processing circuit 130.

It should be noted that the system control circuit 180 calculates the exposure condition for shooting based on the result of the automatic exposure (AE) process, conditions required for dynamic range expansion, etc., and controls the lens control unit 111 and the image-pickup-device-drive circuit 121 based on the calculated exposure conditions.

An operation unit 190 includes a release button, a mode change dial, etc., for example, and is used to input instructions by a photographer into the image pickup apparatus 100. Contents of the inputted instructions are notified to the system control circuit 180.

Figure 2:
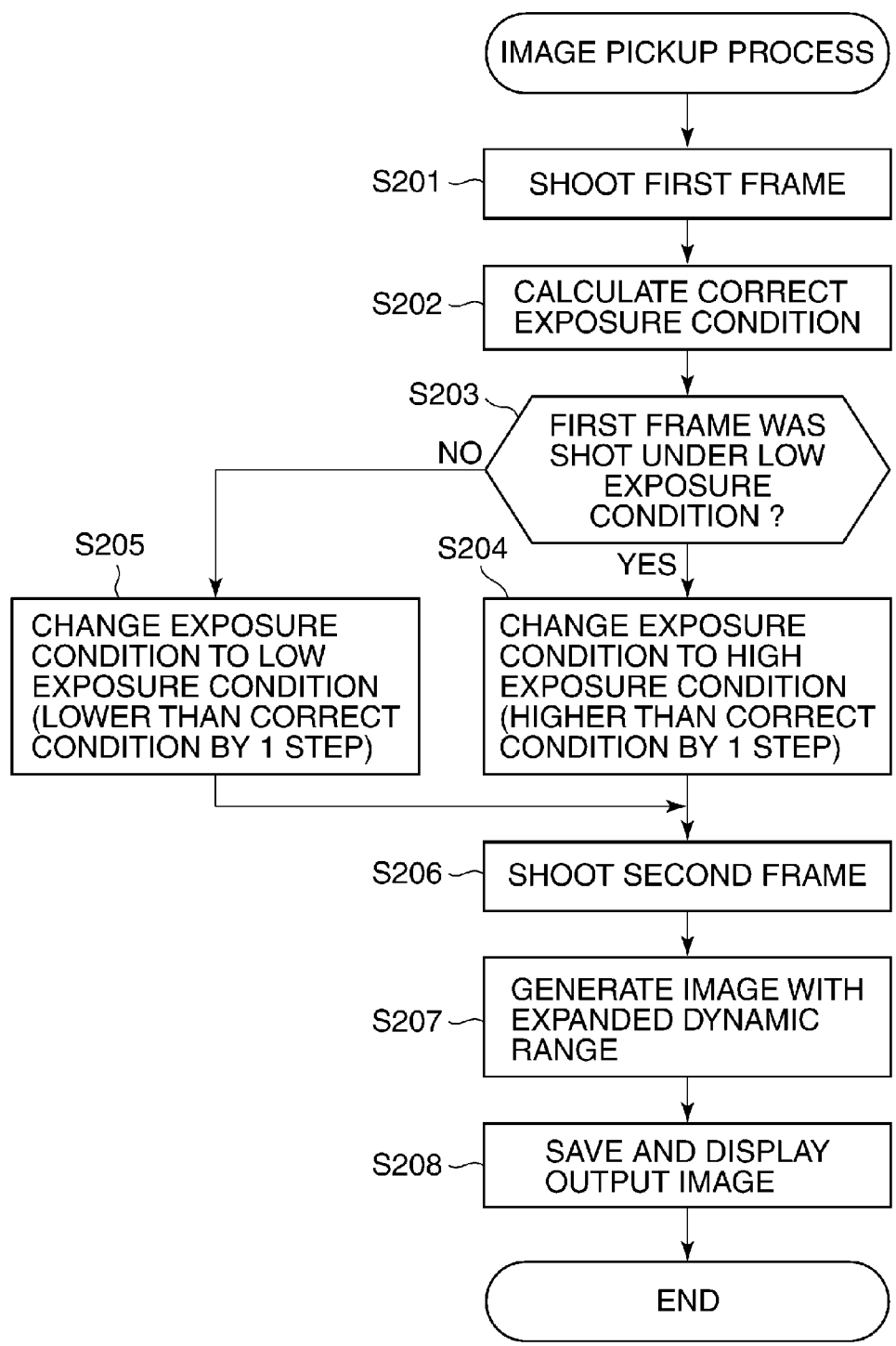
FIG. 2 is a flowchart showing an image pickup process according to the first embodiment executed by a system control circuit shown in FIG. 1.

FIG. 2 is a flowchart showing an image pickup process according to the first embodiment executed by the system control circuit 180 shown in FIG. 1.

Figure 3:
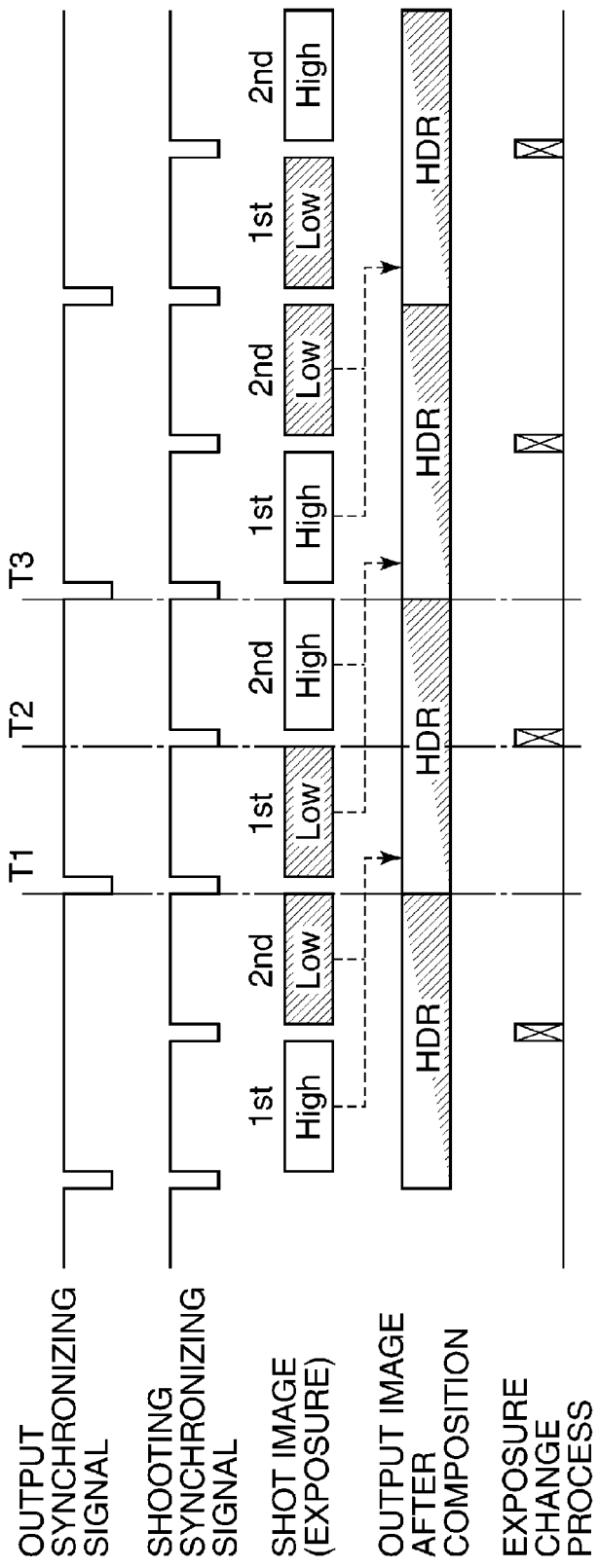
FIG. 3 is a timing chart showing drive timing of the image pickup device and image output timing after composing images according to the process shown in FIG. 2.

FIG. 3 is a timing chart showing drive timing of the image pickup device and image output timing after composing images according to the process shown in FIG. 2.

In the first embodiment, one frame of output image is formed by composing two frames of inputted images that are acquired by shooting a subject continuously under different exposure conditions. In FIG. 2, the first input image among two frames that are used to generate one frame of an output image is called a first frame, and the second input image is called a second frame. In FIG. 3, the first frame and the second frame are described as "1st" and "2nd", respectively.

In FIG. 3, an output synchronizing signal indicates the timing at which the image after composing the images is outputted, and its period corresponds to a frame rate of the image output. A shooting synchronizing signal indicates the timing at which an input image of one frame is shot, and its period corresponds to a frame rate of the image shooting. The image pickup apparatus 100 can capture a moving image by performing the continuous image pickup (continuously shooting in a predetermined interval) by a plurality of sets continuously. In this example, the period of the output synchronizing signal is double the period of the shooting synchronizing signal. As shown in FIG. 3, during one set of the continuous image pickup, two images are shot continuously using two different exposure conditions (High, Low) at a predetermined interval. Accordingly, the continuous image pickup is performed once for one output synchronization signal.

As shown in FIG. 3, synchronizing with the shooting synchronizing signal, the high exposure image High and the low exposure image Low are acquired as input images, and an output image HDR with expanded dynamic range that is generated by composing the high and low exposure images is outputted as the following frame. An exposure change process is executed at the same period as that for the shooting synchronizing signal with a time lag of half a period.

The image pickup process for acquiring one frame of an outputted image in the embodiment will be described with reference to FIG. 2 and FIG. 3.

At the time T1, a first frame is shot under the same exposure conditions as that for the previous frame, and the shot image is saved in the memory unit 140 (step S201).

At the following time T2, the system control circuit 180 calculates a subject's correct exposure condition acquired through the automatic exposure (AE) process (step S202). The correct exposure condition is determined based on subject brightness and the sensitivity of the image pickup device 120. The correct exposure condition used in the following description has the same meaning.

The system control circuit 180 determines whether the first frame was shot under the low exposure condition in the step S201 (step S203).

When the result of the determination in the step S203 shows that the first frame was shot under the low exposure condition (YES in the step S203), the exposure condition is changed to the high exposure condition that is higher than the correct exposure condition by 1 step (step S204), and the process proceeds to step S206.

On the other hand, when the first frame was shot under other than the low exposure condition (NO in the step S203), the exposure condition is changed to the low exposure condition that is lower than the correct exposure condition by 1 step (step S205), and the process proceeds to the step S206. Thus, the exposure condition is determined depending on the correct exposure condition.

The system control circuit 180 directs the exposure condition changed in the step S204 or S205 to the lens control unit 111 and the image-pickup-device-drive circuit 121.

Subsequently, the second frame is shot under the changed exposure condition (step S206), and the shot image is saved in the memory unit 140.

Then, at the time T3, the dynamic range expanding circuit 200 composes the high exposure image and the low exposure image that are saved in the memory unit 140 and generates one frame of the output image with the expanded dynamic range (step S207).

Subsequently, the image processing circuit 130 applies image processing to the one frame of the output image generated in the step S207, the processed output image is saved into the memory card 170 and is displayed on the LCD panel 150 (step S208), and then, the process is finished.

Since the dynamic range composing method using a high exposure image and a low exposure image is a general method, detailed description is omitted (for example, see Japanese laid-open patent publication (Kokai) No. S63-306779).

One set of continuous image pickup shown in the above-mentioned image pickup process is performed for every frame of the output image. Then, a moving image is shot and saved by performing a plurality of sets of continuous image pickup continuously.

In the process shown in FIG. 2, when a first frame is shot under the high exposure condition and a second frame is shot under the low exposure condition in a certain set of the continuous image pickup, a first frame will be shot under the low exposure condition and a second frame will be shot under the high exposure condition in the next set of the continuous image pickup. The difference of the order does not obstruct the process for composing images by the dynamic range expanding circuit 200.

As mentioned above, since the image pickup process in the embodiment shoots a subject under the same exposure condition as that for the previous frame in the step S201, the switching count of the exposure condition is reduced as compared with the prior art shown in FIG. 7.

Although the high and low exposure conditions are defined as "+1 step" and "−1 step" with respect to the correct exposure condition, respectively, in the embodiment, other steps may be used.

The process in the steps S201 through S206 among the image pickup process in FIG. 2 corresponds to a function of the control unit that controls the image pickup unit so that the exposure condition for the first shot in the current set (second or later set) is coincident with the exposure condition for the last shot in the previous set in the continuous image pickup. As a result, since the switching count of the exposure conditions is reducible as compared with the case where the exposure conditions are switched as (High, Low), (High, Low), the load of the process required to combine images with different exposures to generate a composite image can be reduced.

The first embodiment provides the image pickup apparatus that reduces the switching count of shooting exposures in the video system that combines images with different exposure conditions to generate an image with expanded dynamic range.

The second embodiment aims to smooth a motion of a subject on a moving image acquired when shooting the subject that moves at high speed. In the first embodiment, since the shooting order of a high exposure image and a low exposure image is interchanged for every set of the continuous image pickup, the interval of the shot under the same exposure condition is irregular. Accordingly, when the low exposure image is used as the composite output image due to whiteouts in the high exposure image, for example, since the interval of the shot under the low exposure condition is irregular, smoothness of a motion of a subject that moves at high speed in a moving image is lost.

Accordingly, the second embodiment decreases the frequency of the exposure change process as well as the first embodiment shown in FIG. 3 when a motion of a subject is small. On the other hand, when a motion of a subject is large, the second embodiment switches a shooting sequence so that the intervals of the shot under the low exposure condition and the shot under the high exposure condition become regular, respectively, like the prior art shown in FIG. 7.

It should be noted that the configuration of the image pickup apparatus 100 in the second embodiment is the same as the configuration shown in FIG. 1.

Figure 4:
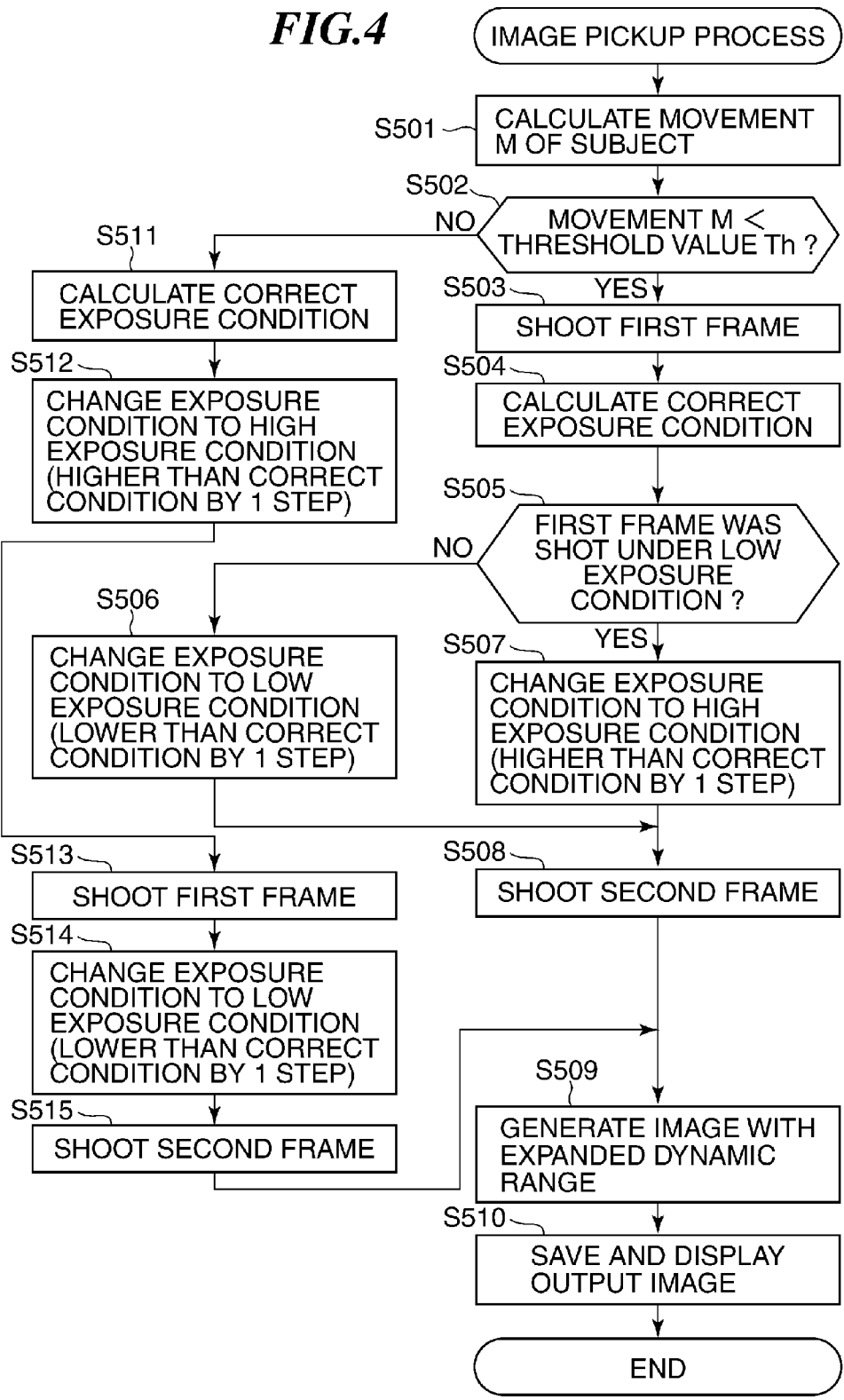
FIG. 4 is a flowchart showing an image pickup process according to the second embodiment executed by the system control circuit shown in FIG. 1.

FIG. 4 is a flowchart showing an image pickup process according to the second embodiment executed by the system control circuit 180 shown in FIG. 1.

At the time T1, the motion detection circuit 210 calculates movement M of the main subject based on the image of the previous frame and the image of the second frame previous to the current frame that are inputted (step S501). The movement M is calculated by integrating the difference of coordinates that indicate edge sections of the main subject between the frames. The motion detection is a general technique, and its description is omitted.

Next, the system control circuit 180 determines whether the movement M is less than a predetermined threshold value Th (step S502). When the movement M is less than the threshold value Th (YES in the step S502), it is determined that the motion is very small, a first frame is shot under the same exposure conditions as that in the previous frame, and the shot image is saved in the memory unit 140 (step S503).

At the following time T2, the system control circuit 180 calculates a subject's correct exposure condition acquired through the automatic exposure (AE) process (step S504).

It is determined whether the first frame was shot under the low exposure condition in the step S503 (step S505).

When the result of the determination in the step S505 shows that the first frame was shot under the low exposure condition (YES in the step S505), the exposure condition is changed to the high exposure condition that is higher than the correct exposure condition by 1 step (step S507), and the process proceeds to step S508.

On the other hand, when the first frame was shot under other than the low exposure condition (NO in the step S505), the exposure condition is changed to the low exposure condition that is lower than the correct exposure condition by 1 step (step S506), and the process proceeds to the step S508.

The system control circuit 180 directs the exposure condition changed in the step S506 or S507 to the lens control unit 111 and the image-pickup-device-drive circuit 121.

Subsequently, the second frame is shot under the changed exposure condition (step S508), and the shot image is saved in the memory unit 140.

Then, at the time T3, the dynamic range expanding circuit 200 composes the high exposure image and the low exposure image that are saved in the memory unit 140 and generates one frame of the output image with the expanded dynamic range (step S509).

Subsequently, the image processing circuit 130 applies image processing to the one frame of the output image generated in the step S509, the processed output image is saved into the memory card 170 and is displayed on the LCD panel 150 (step S510), and then, the process is finished.

On the other hand, when the movement M is not less than the threshold value Th (NO in the step S502), the system control circuit 180 calculates a subject's correct exposure condition acquired from the automatic exposure (AE) process (step S511).

Next, the system control circuit 180 calculates the high exposure condition that is higher than the correct exposure condition by 1 step and changes the condition to the high exposure condition (step S512), and directs the exposure condition to the lens control unit 111 and the image-pickup-device-drive circuit 121.

Subsequently, a first frame is shot under the changed exposure condition (step S513), and the shot image is saved in the memory unit 140.

At the following time T2, the system control circuit 180 calculates the low exposure condition that is lower than the correct exposure condition by 1 step and changes the condition to the low exposure condition (step S514), and directs the exposure condition to the lens control unit 111 and the image-pickup-device-drive circuit 121.

A second frame is shot under the changed exposure condition (step S515), the shot image is saved in the memory unit 140, and the process proceeds to the step S509 mentioned above.

As mentioned above, the process in FIG. 4 can decrease the frequency of the exposure change process when a motion of the main subject is small. On the other hand, when a motion of the main subject is large, it becomes possible to smooth the motion of the main subject in an output moving image by performing the exposure change process so that the intervals of the shoot timings under the exposure condition that is used in preference to the other exposure condition become regular (the orders of the exposure conditions in the respective sets are identical when images of two frames are composed). That is, the exposure change process is performed so that the intervals of the shot under the low exposure condition and the shot under the high exposure condition become regular.

The steps S503 through S508 among the image pickup process in FIG. 4 corresponds to a function of the control unit that controls the image pickup unit so that the exposure condition for the first shot in the current set (second or later set) is coincident with the exposure condition for the last shot in the previous set in the continuous image pickup. Moreover, the steps S511 through S515 corresponds to a function of the control unit that the intervals of the shoot timings under the exposure condition that is used in preference to the other exposure condition become regular in the continuous image pickup.

According to the embodiment, the output image with expanded dynamic range can be generated, while decreasing the frequency of the exposure change process when the motion of the subject is small, and keeping the smoothness of the motion when the motion of the subject is large.

The third embodiment shows a case where the period of the output synchronization signal is triple the period of the shooting synchronizing signal. In this case, the intervals of the image pickup timing under the correct exposure condition become regular while decreasing the frequency of the exposure change process at the time of shooting. As a result, the smoothness of a motion can be kept even when a subject moves at high speed.

Figure 5:
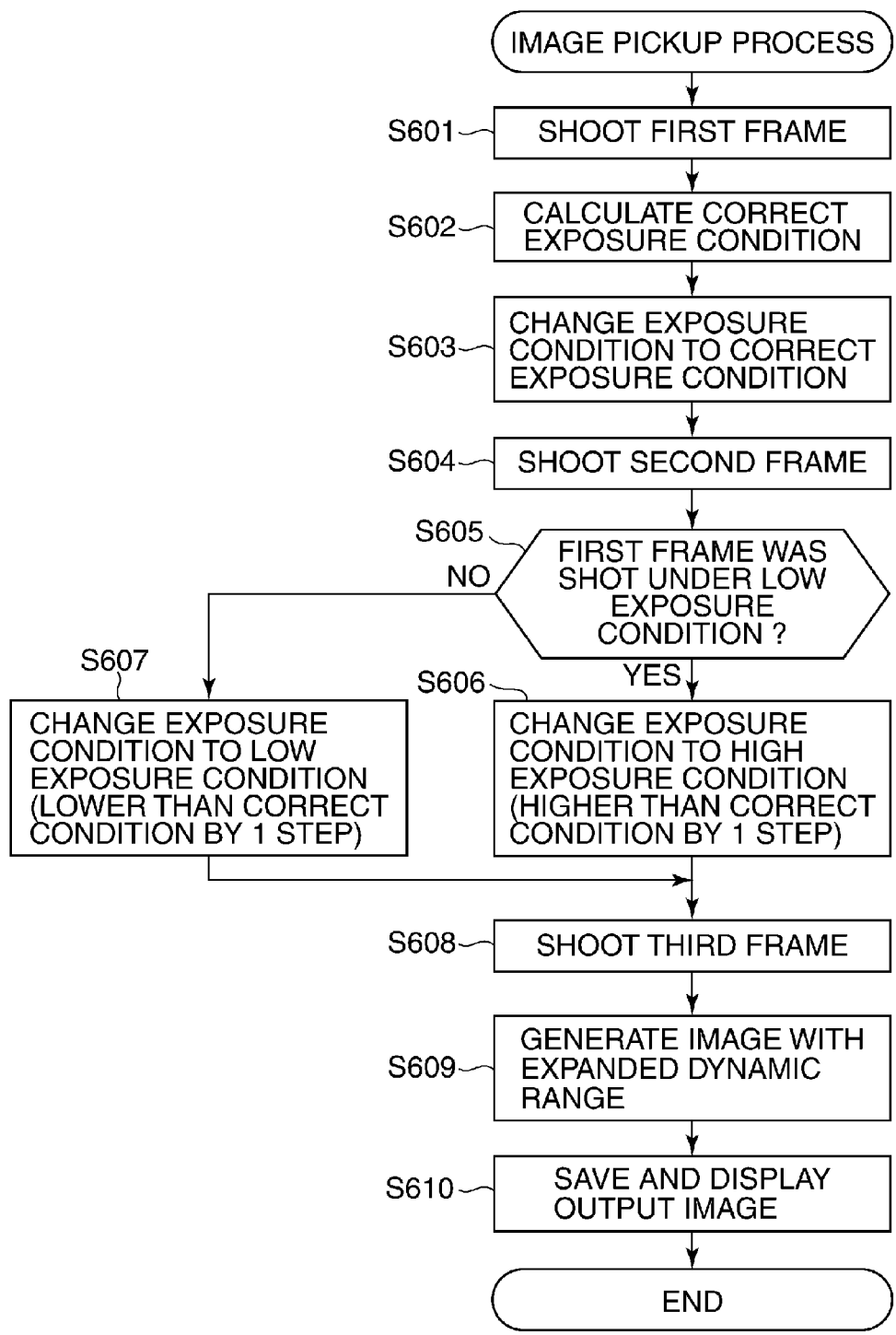
FIG. 5 is a flowchart showing an image pickup process according to the third embodiment executed by the system control circuit shown in FIG. 1.

FIG. 5 is a flowchart showing an image pickup process according to the third embodiment executed by the system control circuit 180 shown in FIG. 1.

Figure 6:
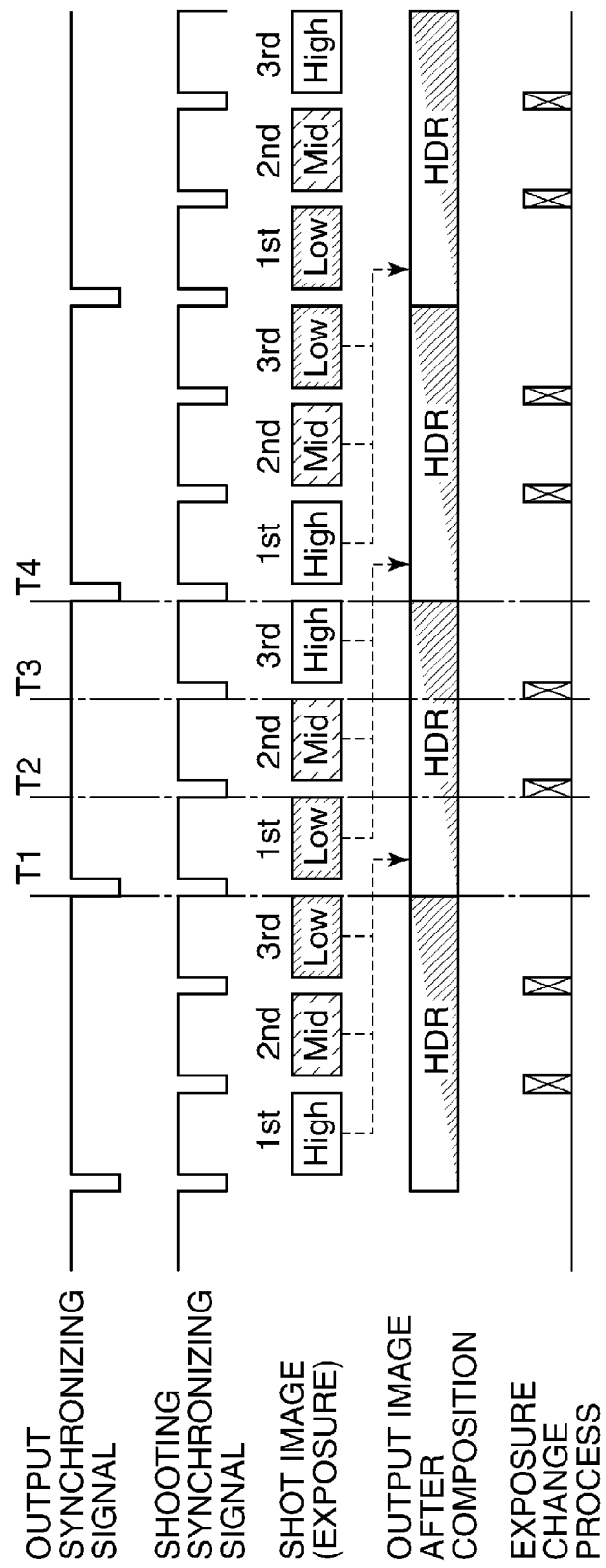
FIG. 6 is a timing chart showing drive timing of the image pickup device and image output timing after composing images according to the process shown in FIG. 5.

FIG. 6 is a timing chart showing drive timing of the image pickup device and image output timing after composing images according to the process shown in FIG. 5.

In FIG. 6, an output synchronizing signal indicates the timing at which the image after composing the images is outputted, and its period corresponds to a frame rate of the image output. A shooting synchronizing signal indicates the timing at which an input image of one frame is shot, and its period corresponds to a frame rate of the image shooting. In this example, the period of the output synchronizing signal is triple the period of the shooting synchronizing signal.

In the third embodiment, one frame of output image is formed by composing three frames of inputted images that are acquired by shooting a subject continuously under different exposure conditions. In FIG. 5, the first input image among three frames that are used to generate one frame of an output image is called a first frame, the second input image is called a second frame, and the third input image is called a third frame. In FIG. 6, the first, second, and third frames are described as "1st", "2nd", and "3rd", respectively.

As shown in FIG. 6, synchronizing with the shooting synchronizing signal, the high exposure image High, the correct exposure image Mid, and the low exposure image Low are acquired as input images, and an output image HDR with expanded dynamic range that is generated by composing these input images is outputted as the following frame. Moreover, the exposure change process is performed at the same timing as the shooting synchronizing signal corresponding to the second and third frames.

At the time T1, a first frame is shot under the same exposure conditions as that for the previous frame (step S601), and the shot image is saved in the memory unit 140.

At the following time T2, the system control circuit 180 calculates a subject's correct exposure condition acquired through the automatic exposure (AE) process (step S602). The system control circuit 180 directs the lens control unit 111 and the image-pickup-device-drive circuit 121 to change the exposure condition to the correct exposure condition (step S603).

Subsequently, the second frame is shot under the correct exposure condition (step S604), and the shot image is saved in the memory unit 140.

At the following time T3, the system control circuit 180 determines whether the first frame was shot under the low exposure condition in the step S601 (step S605).

When the result of the determination in the step S605 shows that the first frame was shot under the low exposure condition (YES in the step S605), the exposure condition is changed to the high exposure condition that is higher than the correct exposure condition by 1 step (step S606), and the process proceeds to step S608.

On the other hand, when the first frame was shot under other than the low exposure condition (NO in the step S605), the exposure condition is changed to the low exposure condition that is lower than the correct exposure condition by 1 step (step S607), and the process proceeds to the step S608.

The system control circuit 180 directs the exposure condition changed in the step S606 or S607 to the lens control unit 111 and the image-pickup-device-drive circuit 121.

Subsequently, the third frame is shot under the changed exposure condition (step S608), and the shot image is saved in the memory unit 140.

Then, at the time 4, the dynamic range expanding circuit 200 composes the high exposure image, the correct exposure image, and the low exposure image that are saved in the memory unit 140 and generates one frame of the output image with the expanded dynamic range (step S609).

Subsequently, the image processing circuit 130 applies image processing to the one frame of the output image generated in the step S609, the processed output image is saved into the memory card 170 and is displayed on the LCD panel 150 (step S610), and then, the process is finished.

Since the dynamic range composing method using a high exposure image and a low exposure image is a general method, detailed description is omitted (for example, see Japanese laid-open patent publication (Kokai) No. S63-306779).

One set of continuous image pickup shown in the above-mentioned image pickup process is performed for every frame of the output image. Then, a moving image is shot and saved by performing a plurality of sets of continuous image pickup continuously.

Since the image pickup process in the embodiment shoots a subject under the same exposure condition as that for the previous frame in the step S601, the switching count of the exposure condition is reduced as compared with the prior art that the switching count of the exposure condition is the same as that of the shooting synchronizing signal. Since the intervals of the input images (the second frames) under the correct exposure condition that are used in preference to other images are regular, it becomes possible to smooth the motion of the main subject in an output moving image even when the main subject moves at high speed.

Although the high and low exposure conditions are defined as "+1 step" and "−1 step" with respect to the correct exposure condition, respectively, in the embodiment, other steps may be used.

The third embodiment provides the image pickup apparatus that decreases the frequency of the exposure change process and keeps the smoothness of the motion of the subject in the video system that combines images with different exposures to generate an image with expanded dynamic range.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-207293, filed on Sep. 22, 2011, which is hereby incorporated by reference herein in its entirety.

What is claimed is:

1. An image pickup apparatus comprising:
   an image pickup unit configured to perform continuous image pickup that shoots a subject continuously under different exposure conditions;
   a control unit configured to control said image pickup unit so that the exposure condition for the first shot in a current set, which is a second or later set, is coincident with the exposure condition for the last shot in the previous set when a plurality of sets of the continuous image pickup are performed; and
   a composing unit configured to compose the images acquired by one set of the continuous image pickup by said image pickup unit to generate one output image.

2. The image pickup apparatus according to claim 1, further comprising:
   a detection unit configured to detect movement of the subject,
   wherein said control unit control said image pickup unit so that the exposure condition for the first shot in a current set, which is a second or later set, is coincident with the exposure condition for the last shot in the previous set when a plurality of sets of the continuous image pickup are performed and when the movement detected by said detection unit is less than a predetermined threshold value, and
   wherein said control unit control said image pickup unit so that intervals of the shoot timings under the exposure condition that is used in preference to the other exposure condition become regular in the continuous image pickup when the movement detected by said detection unit is not less than the predetermined threshold value.

3. The image pickup apparatus according to claim 1, wherein the exposure conditions are determined depending on a correct exposure condition that is acquired based on subject brightness and a sensitivity of an image pickup device provided in said image pickup unit.

4. A control method for an image pickup apparatus that performs continuous image pickup that shoots a subject continuously under different exposure conditions, the control method comprising:
- a control step of controlling the image pickup unit so that the exposure condition for the first shot in a current set, which is a second or later set, is coincident with the exposure condition for the last shot in the previous set when a plurality of sets of the continuous image pickup are performed; and
- a composing step of composing the images acquired by one set of the continuous image pickup by the image pickup unit to generate one output image.

5. A non-transitory computer-readable storage medium storing a control program causing a computer to execute a control method for an image pickup apparatus that performs continuous image pickup that shoots a subject continuously under different exposure conditions, the control method comprising:
- a control step of controlling the image pickup unit so that the exposure condition for the first shot in a current set, which is a second or later set, is coincident with the exposure condition for the last shot in the previous set when a plurality of sets of the continuous image pickup are performed; and
- a composing step of composing the images acquired by one set of the continuous image pickup by the image pickup unit to generate one output image.

* * * * *